Dec. 19, 1961 A. W. HARKNESS 3,013,278
CONNECTOR BETWEEN HOLLOW VALVE AND LIFT MEMBER
Filed Nov. 18, 1958 2 Sheets-Sheet 1
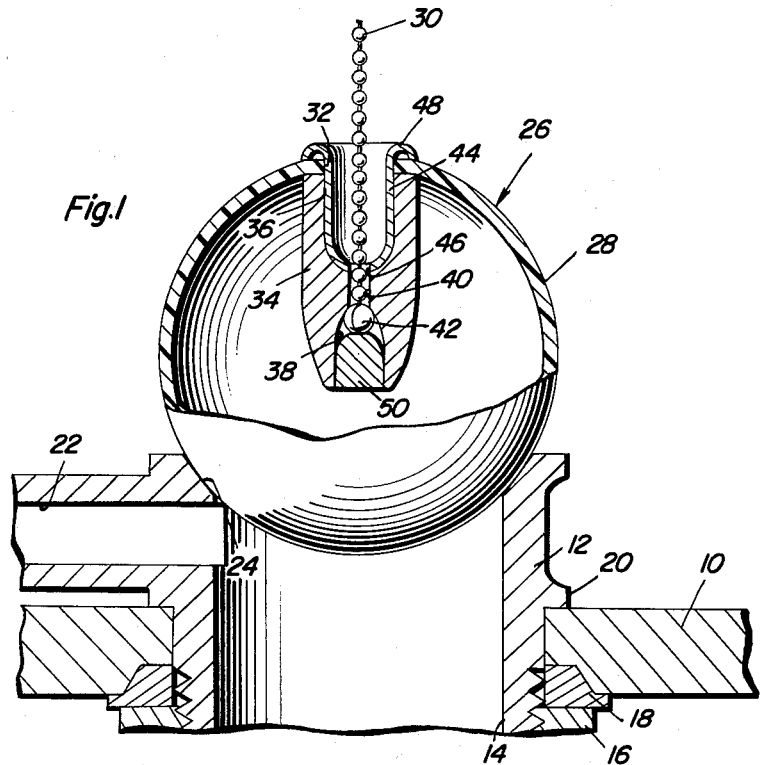
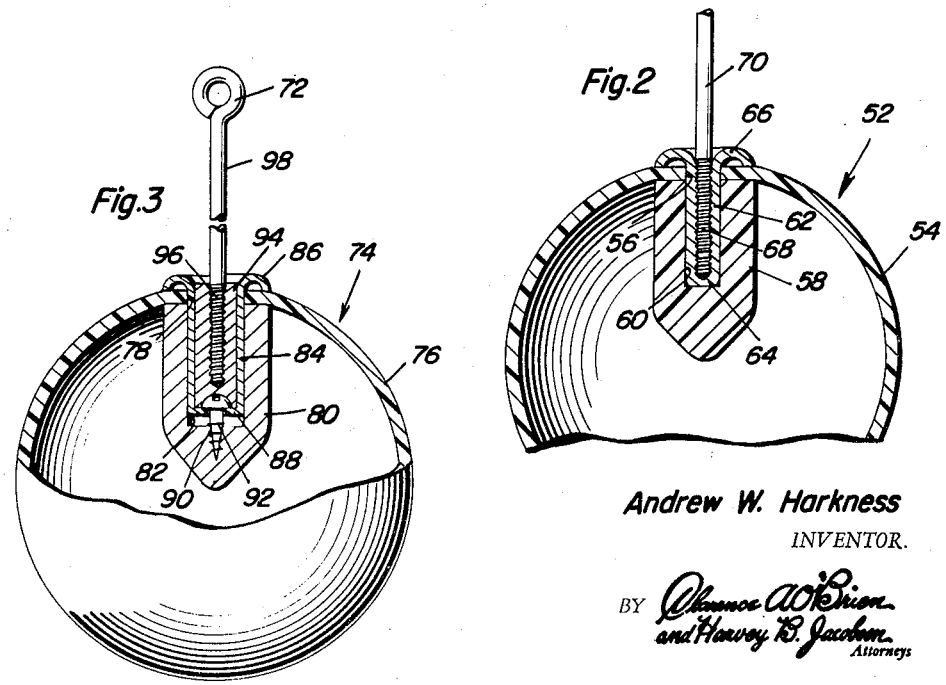
Andrew W. Harkness
INVENTOR.

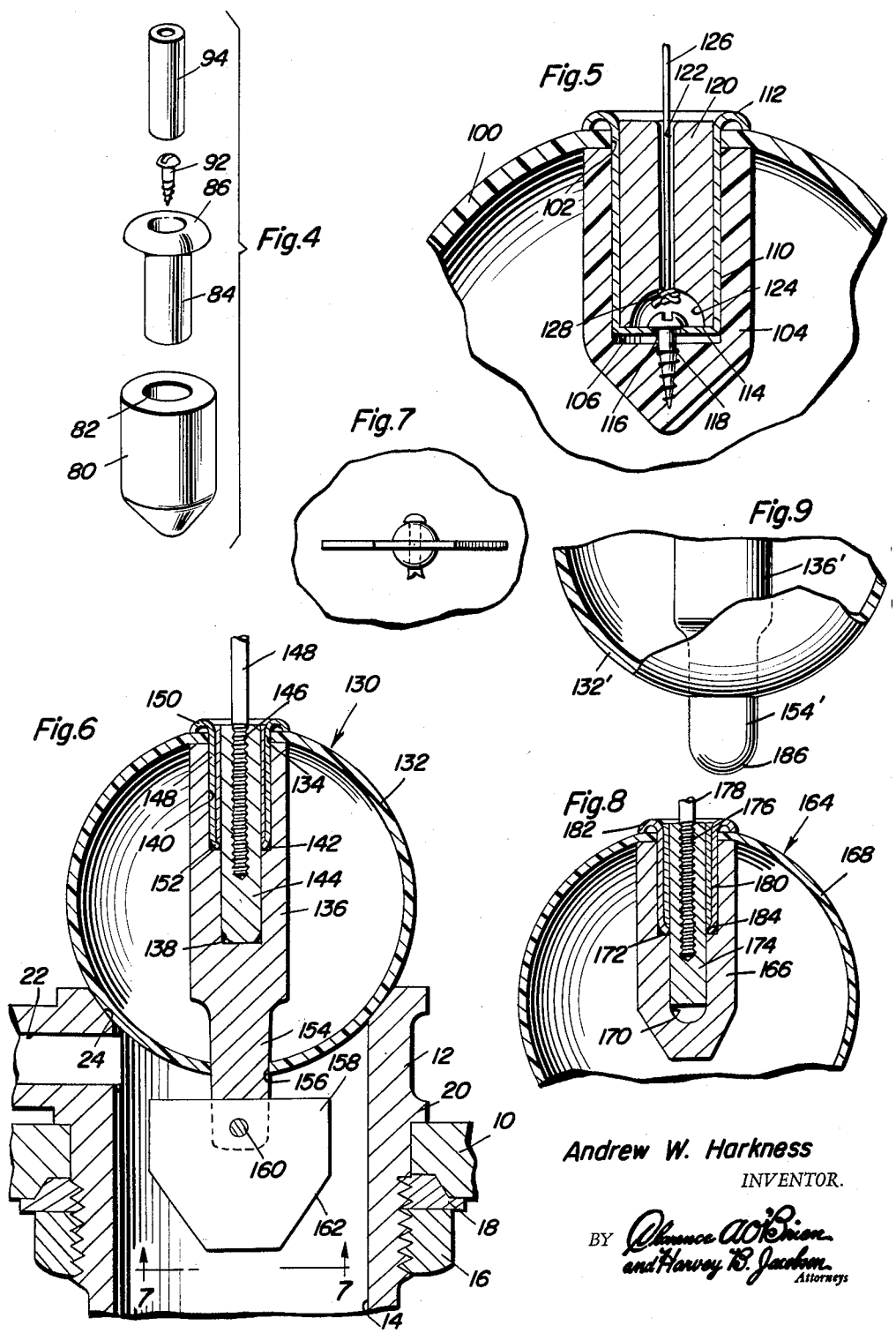

United States Patent Office 3,013,278
Patented Dec. 19, 1961

3,013,278
CONNECTOR BETWEEN HOLLOW VALVE AND LIFT MEMBER
Andrew W. Harkness, 36 Jackson Ave., South Glens Falls, N.Y.
Filed Nov. 18, 1958, Ser. No. 774,734
5 Claims. (Cl. 4—56)

The present invention generally relates to a novel structural arrangement in small type valves for use in flush tanks and more particularly to a novel and improved connecting means between the hollow ball valve and the lift member therefor.

In the construction of flush tanks, there is a valve seat provided in the bottom thereof which valve seat is located at the upper end of a drain fitting and which receives a valve member connected with a lift lever whereby the valve will be lifted off of the seat when it is desired to discharge the water from the tank. The valve member is of a construction which is hollow which will float when lifted off of the valve seat and the conventional connection between the valve member and the lift lever has been a source of continuous trouble in that the connecting mechanism quite often operated improperly since the same quite often was subject to binding and resultant improper seating of the valve member. In the present invention, a hollow ball type flush valve is being used and a flexible element is provided for connection with the lift lever together with a novel structure for connecting the flexible lift element to the ball flush valve.

Heretofore, there have been hollow ball valves constructed of rubber material which is subject to deterioration after an extended period of time due to exposure to air, light, water and age. The present invention incorporates the construction of a hollow ball valve of vinyl plastic with the novel connecting means providing an assembly which is capable of withstanding for an indefinite period of time any deterioration from exposure to air, light, water and age thus resulting in a considerable saving due to the longevity of the ball valve.

The present invention also has for its object the provision of several different connector assemblies for connecting the ball valve to a lift element for maintaining the waterproof relationship of the ball valve.

A further object of the present invention is to provide a connector which incorporates a guide mechanism extending below the ball valve for guiding the valve onto the valve seat so that the same will be centered with the ball being capable of being positioned on the valve seat at various positions.

These together with other objects and advantages which will become subsequently apparent reside in the details of construction and operation as more fully hereinafter described and claimed, reference being had to the accompanying drawing forming a part hereof, wherein like numerals refer to like parts throughout and in which:

FIGURE 1 is a side elevational view of a ball valve with a portion thereof broken away and illustrating the construction of the connecting means together with the orientation of the valve in relation to the drain pipe and bottom of the flush tank which is shown in section;

FIGURE 2 is a sectional view illustrating a modified form of the connector between the ball valve and lift member;

FIGURE 3 is a side elevational view of a ball valve with portions broken away showing another form of the connector;

FIGURE 4 is an exploded group perspective view of the connector of FIGURE 3;

FIGURE 5 is a partial sectional view of a ball valve illustrating another form of the invention;

FIGURE 6 is a sectional view of a ball valve illustrating a modified connector having a depending guide mechanism thereon and illustrating the relationship thereof to the discharge opening and valve seat;

FIGURE 7 is a bottom plan view taken substantially upon a plane passing along reference line 7—7 of FIGURE 6 illustrating the structural arrangement of the guide member;

FIGURE 8 is a sectional view similar to FIGURE 6 with the guide mechanism eliminated; and FIGURE 9 is a partial sectional view of still another modified form of invention with the modified form of guide member depending below the ball valve.

In both FIGURES 1 and 6, a conventional flush tank assembly is shown including the flush tank bottom 10 having a discharge fitting or pipe 12 extending therethrough which has a discharge opening 14 and which is secured in position by a clamp nut 16 and a sealing gasket 18 on one side of the bottom 10 and a flange 20 on the upper surface thereof. The opening 14 communicates with an overflow passage 22 which receives water from the usual overflow pipe and also the refill tube for discharging the same in through the commode bowl. The upper end of the discharge fitting 12 is provided with a valve seat 24 for receiving the ball valve of the present invention for forming a closure for the discharge opening 14. The foregoing construction is conventional and is shown in the same manner in FIGURES 1 and 6 with the same reference numerals being applied thereto.

In FIGURE 1, the ball valve is generally designated by the numeral 26 and includes a hollow spherical ball 28 for connection to a flexible bead chain 30 which is connected at its upper end to a conventional lift lever (not shown). The ball 26 is provided with a round hole 32 through which a generally cylindrical elongated body or block 34 has been inserted, said body including a square-cut outer end which abuts said ball. The block 34 has a rather enlarged socket or bore 36 communicating with the upper end thereof and a smaller socket or bore 38 communicating with the lower end thereof with the sockets or bores 36 and 38 being interconnected by a longitudinal bore 40 which is smaller than either of the bores 36 and 38.

The bead chain 30 is provided with an enlarged bead 42 on the lower end thereof which is received in the bore 38 with the bead chain 30 extending through the bore 40 and through the bore 36. A generally tubular insert 44 is disposed in the bore 36 and includes an opening in the rounded closed bottom end thereof with the opening being designated by the numeral 46 which also receives the beaded chain 30. The insert 44 extends through the opening 32 in the ball 28 and terminates in an outwardly flared and reversely bent or rolled external end flange 48 which engages the exterior surface of the ball 28 in opposition to the body or block 34 thus sealing the opening 32 in relation to the body or block 34. The lower end of the bore 38 is sealed and closed by a plug 50 which not only serves to seal the body 34 but also retains the beaded chain 30. The dowel or plug 50 may be pushed into place and permanently cemented thereto. The tubular member 44 may be termed a bead chain sleeve and may have a slit or slot extending throughout the length of one side thereof for facilitating the assembly thereof onto the beaded chain 30.

FIGURE 2 illustrates a modified form of the present invention with the ball valve being designated in general by the numeral 52 and including a hollow ball 54 having an opening 56 therein through which has been inserted a body or block 58 having a longitudinally extending bore 60 therein which communicates with the upper end thereof and which communicates with the opening 56. An internally threaded tubular sleeve 62 is inserted into the bore 60 and has a closed lower end 64 with the upper end thereof extending outwardly through the opening 56 and terminating in a reversely bent upper flange 66 for sealing the ball 64 to the body or block 58. The internally threaded sleeve 62 receives the externally threaded end 68 of a rod 70 which may terminate in its upper end in an eye member such as the eye member 72 shown in FIGURE 3 for attachment to a suitable flexible lift member such as a beaded chain or plastic coated flexible wire.

FIGURE 3 illustrates another form of ball valve designated by the numeral 74 including a hollow spherical ball 76 having an opening 78 therein through which a body or block 80 has been inserted. The body or block 80 is provided with a longitudinal blind bore 82 therein which receives a cylindrical insert 84 extending through the opening 78 and terminating in a reversely bent flange 86 at the upper end thereof. The bottom 88 of the insert is provided with an opening 90 for receiving a screw threaded fastener 92 which anchors the sleeve 84 to the body or block 80. An internally threaded sleeve-like insert 94 is provided in the cylindrical member 84 and the sleeve-like insert is internally threaded for receiving the threaded end 96 of a lift wire 98 having the eye 72 on the upper end thereof which may be attached to a suitable lift wire.

The device in FIGURE 5 is similar to FIGURE 3 and includes a spherical hollow ball 100 having an opening 102 therein for receiving a body or block 104 having a blind longitudinal bore 106 which receives a cylindrical sleeve 110 having the reversely bent flange 112 on the upper end thereof and a closed bottom 114 on the lower end thereof which has an opening 116 receiving a screw threaded fastener 118 which anchors the sleeve 110 to the body or block 104. Disposed in the sleeve insert 110 is an insert member 120 having a relatively small longitudinal bore 124 therein along with a generally semi-spherical recess 124 in the lower end thereof. The bore or passageway 122 receives a nylon coated wire 126 which is provided with a knot 128 at the lower end thereof and disposed in the recess 124 thereby connecting the lift wire 126 to the ball 100.

FIGURE 6 illustrates another modified form of the valve generally designated by the numeral 130 including a hollow spherical ball 132 having an aperture 134 therein together with an elongated cylindrical body 136 which has an inner longitudinal bore 138 of one diameter and an outer longitudinal bore 140 of a larger diameter thus forming a shoulder 142 at the juncture thereof. Inserted into the smaller bore 138 is an elongated insert 144 having an internally threaded bore communicating with the upper end thereof for receiving the internally threaded end 146 of a lift wire 148. Disposed in concentric relation to the insert 144 is an inserted sleeve 148 having a rolled flange 150 on the upper end thereof and having a rounded and inwardly extending peripheral enlargement 152 at the lower end thereof for frictionally engaging the outer surface of the insert 144, thus securing the body 136 to the ball 132 in fluid tight relation.

The lower end of the body 136 is provided with a longitudinal projection 154 which extends through an opening 156 in the ball valve in sealed relation and in diametric opposition to the opening 134. The free end of the extension 154 is bifurcated and receives therebetween a flexible or pliable guide member 158 which is hingedly connected thereto by a pivot pin 160 extending through and between the bifurcated end of the extension 154. The guide member 158 is provided with inclined edges 162 for guiding and centering the ball 132 on the seat 24. The guide member 158 is made of pliable and resilient material so that the same will not resist movement of the ball valve in a normal manner but will guide the ball valve centrally onto the seat 24.

FIGURE 8 illustrates a modified form of the invention in which the construction is very similar to FIGURE 6 and which is designated by the numeral 164. In this form of the invention, the body 166 terminates interiorly of the spherical ball 168 and the body 166 is provided with an inner bore 170 and an outer larger bore 172 for receiving an elongated insert 174 having the externally threaded end 176 of a lift wire 178 received therein. A sleeve insert 180 having a rolled upper flange 182 is received in the bore 172 and has an inturned peripheral edge 184 for frictionally engaging and retaining the body 174.

FIGURE 9 illustrates another form of the invention in which the body 136' and the extension 154' are substantially the same as that shown in FIGURE 6 with the exception that the extension 154' terminates in a rounded spherical lower end 186 which acts as a guide in a similar manner to the arrow shaped guide member 158 and which is associated with the ball valve 132' in the same manner.

In all instances, the threaded shafts could be removed and the nylon coated wire or beaded chain substituted therefor by extending the internally threaded bore all of the way through the insert such as the insert 174 in FIGURE 8, the insert 144 in FIGURE 6 and the insert 94 in FIGURE 3 with the lower ends of the flexible lift members being either knotted or provided with an enlarged stop member on the beaded chain.

When assembling the device, the various component parts are cemented to each other and to the ball to assure water tight conditioning of the ball for proper operation thereof. Also, the various bodies or blocks are or may be constructed of plastic, rubber or wood. The guide members 158 is constructed of pliable material so that the same will slide into any of the drain fitting components.

The ball itself is constructed of vinyl plastic material which far surpasses rubber in resistance to deterioration from exposure to air, light, water and age. The use of this plastic material rather than the conventional rubber material provides unexpected prolongation of the useful life of the valve.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A connector for a closed flexible hollow ball valve for connecting an operator thereto comprising a body disposed interiorly of the hollow ball valve and connected thereto in sealed relation, a tubular sleeve inserted into said hollow ball and received in said body, and a lift element connecting with said sleeve, said body including an extension on the free end thereof with the extension extending through the diametrically opposed portion of the ball valve and providing a guide for movement of the ball valve onto a valve seat.

2. The structure as defined in claim 1 wherein said extension is provided with a pivotally mounted generally arrow shaped flexible guide for centering the ball on the valve seat.

3. A toilet flush valve comprising a hollow resilient ball having an opening therein, an elongated body of circular cross section insertable through the opening and mounted radially in the ball, said body having a bore extending longitudinally thereinto from one end thereof in alignment with the opening, said one end of said body being square-cut and abutting the inner surface of the ball around the opening, a sleeve fixed in the bore and extending outwardly therefrom through the opening, a rolled, external flange on the outer end of the sleeve engaged with the ball around the opening for securing the body in position and, in conjunction therewith, closing and sealing the opening, and a lift element having one end portion anchored in the sleeve.

4. A toilet flush valve comprising a hollow resilient ball having an opening therein, an elongated body of circular cross section insertable through the opening and mounted radially in the ball, said body having a bore extending longitudinally thereinto from one end thereof in alignment with the opening, said one end of said body being square-cut and abutting the inner surface of the ball around the opening, a sleeve fixed in the bore and extending outwardly therefrom through the opening, a rolled, external flange on the outer end of the sleeve engaged with the ball around the opening for securing the body in position and, in conjunction therewith, closing and sealing the opening, and a lift element having one end portion anchored in the sleeve, said ball having a second opening therein aligned with the first-named opening, said body including an elongated longitudinal guide on its other end projecting through the second opening.

5. A toilet flush valve comprising a hollow resilient ball having an opening therein, an elongated body of circular cross section insertable through the opening and mounted radially in the ball, said body having a bore extending longitudinally thereinto from one end thereof in alignment with the opening, said one end of said body being square-cut and abutting the inner surface of the ball around the opening, a sleeve fixed in the bore and extending outwardly therefrom through the opening, a rolled, external flange on the outer end of the sleeve engaged with the ball around the opening for securing the body in position and, in conjunction therewith, closing and sealing the opening, and a lift element having one end portion anchored in the sleeve, the other end portion of said body being closed and substantially tapered to facilitate inserting said body through the opening.

References Cited in the file of this patent
UNITED STATES PATENTS

| | | |
|---|---|---|
| 895,676 | Pfau | Aug. 11, 1908 |
| 1,214,020 | Douglas | Jan. 30, 1917 |
| 1,286,791 | Saal | Dec. 3, 1918 |
| 1,530,720 | Harroun | Mar. 24, 1925 |
| 2,706,818 | Graziosi | Apr. 26, 1955 |
| 2,788,526 | Blain | Apr. 16, 1957 |
| 2,869,141 | Koch et al. | Jan. 20, 1959 |